US012352595B2

(12) United States Patent
Chow et al.

(10) Patent No.: US 12,352,595 B2
(45) Date of Patent: *Jul. 8, 2025

(54) DYNAMICALLY GENERATING SCENERY FOR A VIRTUAL REALITY DRIVING SESSION BASED ON ROUTE INFORMATION

(71) Applicant: Capital One Services, LLC, McLean, VA (US)

(72) Inventors: Chih-Hsiang Chow, Coppell, TX (US); Andrew Chouman, Northville, MI (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,769

(22) Filed: Mar. 4, 2024

(65) Prior Publication Data
US 2024/0247941 A1    Jul. 25, 2024

Related U.S. Application Data

(63) Continuation of application No. 17/451,379, filed on Oct. 19, 2021, now Pat. No. 11,920,944.

(51) Int. Cl.
*G01C 21/36* (2006.01)
*G02B 27/01* (2006.01)
*G06N 20/00* (2019.01)

(52) U.S. Cl.
CPC ..... *G01C 21/3638* (2013.01); *G01C 21/3602* (2013.01); *G01C 21/3647* (2013.01); *G01C 21/365* (2013.01); *G02B 27/0179* (2013.01); *G06N 20/00* (2019.01); *G02B 2027/0181* (2013.01); *G02B 2027/0187* (2013.01)

(58) Field of Classification Search
CPC ........... G01C 21/3638; G01C 21/3602; G01C 21/3647; G01C 21/365; G02B 27/0179; G06N 20/00
See application file for complete search history.

(56) References Cited

U.S. PATENT DOCUMENTS

| | | |
|---|---|---|
| 9,568,995 B1 | 2/2017 | Lian |
| 11,668,577 B1 | 6/2023 | Nussbaum et al. |
| 2017/0254659 A1* | 9/2017 | Fukumoto .............. B60K 35/00 |
| 2018/0031849 A1 | 2/2018 | Omanovic et al. |
| 2018/0365888 A1 | 12/2018 | Satzoda et al. |

(Continued)

*Primary Examiner* — Seth A Silverman
(74) *Attorney, Agent, or Firm* — Harrity & Harrity, LLP

(57) ABSTRACT

In some implementations, a device may identify objects associated with the route based on one or more images associated with a selected route. The device may generate a model associated with the route including the scenery, wherein the scenery includes models of the objects based on geographic locations of the objects and three-dimensional spatial information of the objects. The device may determine a visual reference point for the virtual reality driving session based on at least one of vehicle information associated with the vehicle or user information. The device may provide, to a virtual reality device, presentation information that causes the virtual reality driving session to be displayed by the virtual reality device from a perspective of the visual reference point within a vehicle model associated with a selected vehicle placed in the model of the route with the scenery.

20 Claims, 9 Drawing Sheets

(56) References Cited

U.S. PATENT DOCUMENTS

| | | | |
|---|---|---|---|
| 2020/0149906 A1 | 5/2020 | Tu et al. | |
| 2020/0333159 A1* | 10/2020 | Jung | G06T 15/20 |
| 2023/0119620 A1 | 4/2023 | Chow et al. | |

* cited by examiner

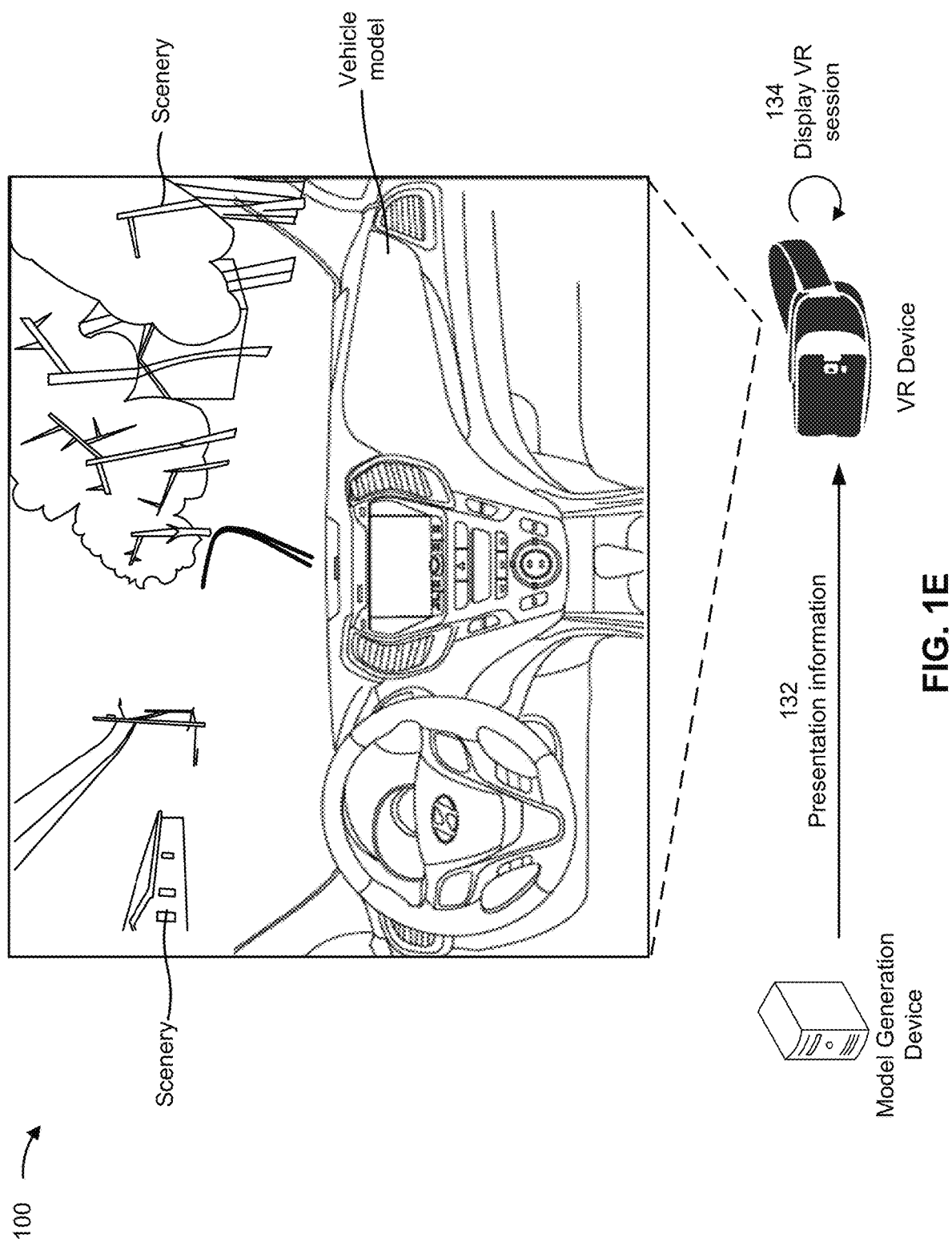

DYNAMICALLY GENERATING SCENERY FOR A VIRTUAL REALITY DRIVING SESSION BASED ON ROUTE INFORMATION

RELATED APPLICATION

This application is a continuation of U.S. patent application Ser. No. 17/451,379, filed Oct. 19, 2021 (now U.S. Pat. No. 11,920,944), which is incorporated herein by reference in its entirety.

BACKGROUND

Virtual reality (VR) may refer to computer technologies that use software to generate realistic images, sounds, and other sensations that replicate a real environment (or create an imaginary setting), and simulate a user's physical presence in the environment. VR may be defined as a immersive simulation of a three-dimensional environment, created using interactive software and hardware, and experienced or controlled by movement of a user's body. For example, in a VR environment, a person using special electronic equipment, such as a helmet with a display inside, goggles with a display inside, among other examples, may interact with a computer-generated simulation of a three-dimensional image or environment in a seemingly real or physical way.

SUMMARY

Some implementations described herein relate to a system for dynamically generating scenery for a virtual reality driving session based on route information. The system may include one or more memories and one or more processors coupled to the one or more memories. The one or more processors may be configured to receive, from a virtual reality device, an indication of a vehicle to be associated with the virtual reality driving session. The one or more processors may be configured to receive, from the virtual reality device, the route information associated with a route to be associated with the virtual reality driving session, wherein the route information includes geographic coordinate information. The one or more processors may be configured to generate a model associated with the route based on the geographic coordinate information and based on topographical information associated with the geographic coordinate information. The one or more processors may be configured to receive one or more images associated with the route information, wherein the one or more images include a first one or more images associated with a first view of the route and a second one or more images associated with a second view of the route. The one or more processors may be configured to identify one or more objects associated with the route based on the one or more images, wherein identifying the one or more objects includes identifying geographic locations of the one or more objects relative to the route and identifying three-dimensional spatial information of the one or more objects relative to the route. The one or more processors may be configured to generate the scenery for the model, wherein the scenery includes models of the one or more objects based on the geographic locations of the one or more objects and the three-dimensional spatial information of the one or more objects. The one or more processors may be configured to determine a visual reference point for the virtual reality driving session based on at least one of vehicle information associated with the vehicle or user information. The one or more processors may be configured to provide, to the virtual reality device, presentation information that causes the virtual reality driving session to be displayed by the virtual reality device from a perspective of the visual reference point within a vehicle model associated with the vehicle placed in the model of the route with the scenery.

Some implementations described herein relate to a method for dynamically generating scenery for a virtual reality driving session based on route information. The method may include receiving, by a device, an indication of a vehicle to be associated with the virtual reality driving session. The method may include receiving, by the device, the route information associated with a route to be associated with the virtual reality driving session, wherein the route information includes geographic coordinate information. The method may include receiving, by the device, one or more images associated with the route information, wherein the one or more images are images of one or more locations indicated by the geographic coordinate information. The method may include identifying, by the device, one or more objects associated with the route based on the one or more images, wherein identifying the one or more objects includes identifying geographic locations of the one or more objects relative to the route and identifying three-dimensional spatial information of the one or more objects relative to the route. The method may include generating, by the device, a model associated with the route including the scenery, wherein the scenery includes models of the one or more objects based on the geographic locations of the one or more objects and the three-dimensional spatial information of the one or more objects. The method may include determining, by the device, a visual reference point for the virtual reality driving session based on at least one of vehicle information associated with the vehicle or user information. The method may include providing, by the device and to a virtual reality device, presentation information that causes the virtual reality driving session to be displayed by the virtual reality device from a perspective of the visual reference point within a vehicle model associated with the vehicle placed in the model of the route with the scenery.

Some implementations described herein relate to a non-transitory computer-readable medium that stores a set of instructions for a virtual reality device. The set of instructions, when executed by one or more processors of the virtual reality device, may cause the virtual reality device to provide a user interface for display by the virtual reality device, wherein the user interface includes one or more user selection options associated with one or more vehicles, and wherein the user interface includes a map interface for receiving route information. The set of instructions, when executed by one or more processors of the virtual reality device, may cause the virtual reality device to detect a first user selection of a vehicle, from the one or more vehicles, for a virtual reality driving session based on a first user interaction, at least one user selection option of the one or more user selection options. The set of instructions, when executed by one or more processors of the virtual reality device, may cause the virtual reality device to detect the route information associated with a route for the virtual reality driving session based on a second user interaction with the map interface of the user interface, wherein the route information includes geographic coordinate information. The set of instructions, when executed by one or more processors of the virtual reality device, may cause the virtual reality device to receive one or more images associated with the route information based on the geographic coordinate information. The set of instructions, when executed by one or more processors of the virtual reality device, may cause the virtual reality device to identify one or more objects associated with the route based on the one or more images, wherein identifying the one or more objects includes identifying geographic locations of the one or more objects relative to the route and identifying three-dimensional spatial information of the one or more objects relative to the route. The set of instructions, when executed by one or more processors of the virtual reality device, may cause the virtual reality device to generate a model associated with the route including scenery, wherein the scenery includes models of the one or more objects based on the geographic locations of the one or more objects and the three-dimensional spatial information of the one or more objects. The set of instructions, when executed by one or more processors of the virtual reality device, may cause the virtual reality device to determine a visual reference point for the virtual reality driving session based on at least one of vehicle information associated with the vehicle or user information. The set of instructions, when executed by one or more processors of the virtual reality device, may cause the virtual reality device to provide the virtual reality driving session to be displayed by the virtual reality device for display by the virtual reality device from a perspective of the visual reference point within a vehicle model associated with the vehicle placed in the model of the route with the scenery.

BRIEF DESCRIPTION OF THE DRAWINGS

FIGS. 1A-1E are diagrams of an example implementation relating to dynamically generating scenery for a virtual reality driving session based on route information.

DETAILED DESCRIPTION

Figure 1A:
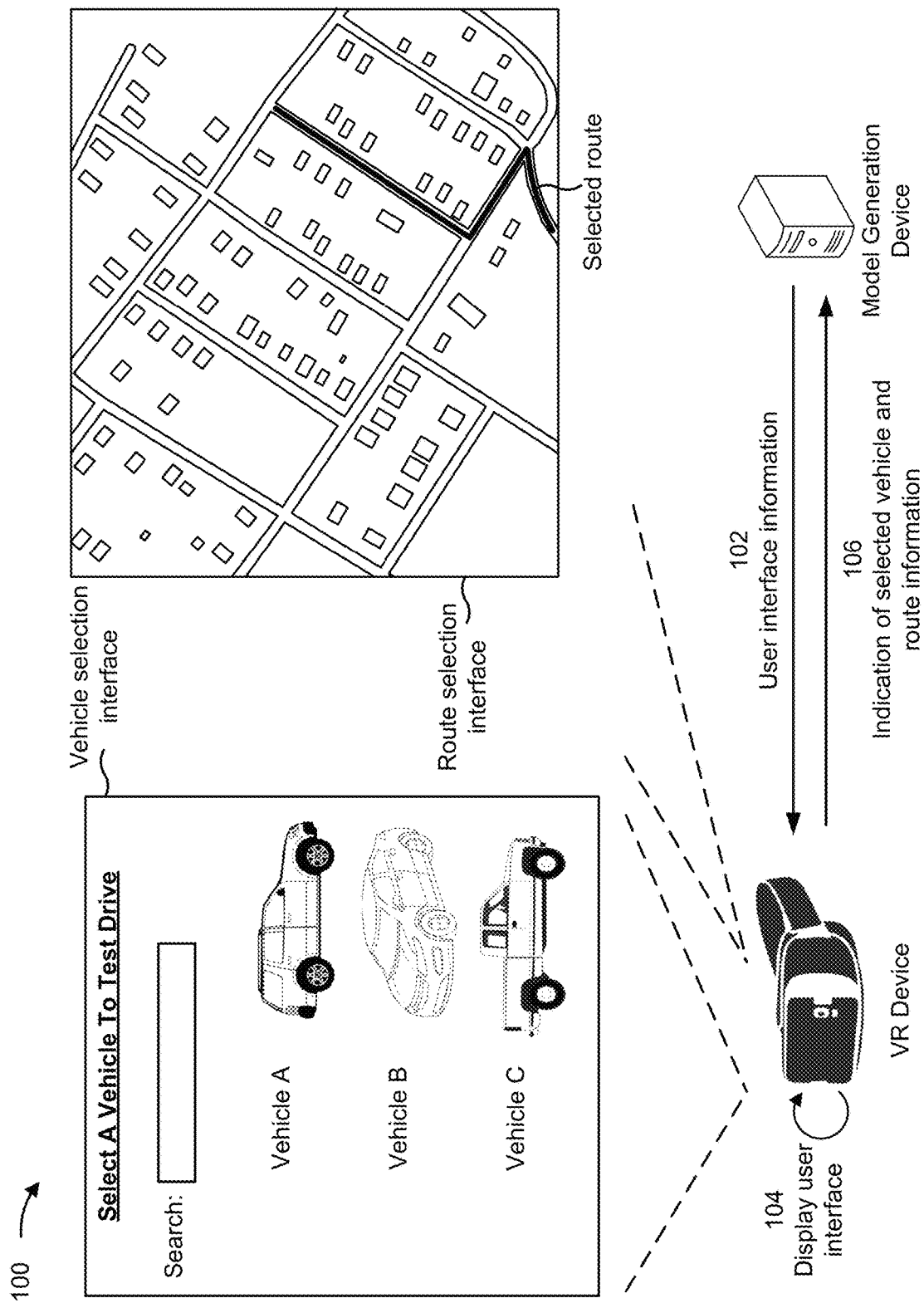

The following detailed description of example implementations refers to the accompanying drawings. The same reference numbers in different drawings may identify the same or similar elements.

To complete a transaction for a vehicle (e.g., to purchase a vehicle and/or rent a vehicle), an individual may visit a dealership to look at or inspect vehicles in person or may visit a website of the dealership to look at images or videos of vehicles. Typically, before purchasing a vehicle, the individual may drive the vehicle (e.g., may "test drive" the vehicle) to get a sense of the look and feel of the vehicle while driving the vehicle. While many aspects of completing the transaction for the vehicle can be completed without visiting the actual dealership (e.g., by looking at images or videos of the vehicles, and/or by interacting with a salesperson virtually or over the phone, among other examples), many individuals do not wish to complete a transaction for a vehicle before physically sitting in the vehicle and/or before test driving the vehicle.

For example, the individual may wish to experience features of the vehicle before deciding whether to purchase the vehicle. The individual researching or investigating (e.g., via online research) the features of the vehicle and viewing demonstrations of the features would consume computing resources (e.g., processing resources, memory resources, power resources, communication resources, and/or the like) and/or network resources. Additionally, if the individual were permitted to perform a test drive of the vehicle to experience the features and get a sense of the look and feel of the vehicle, doing so would consume fuel, increase the mileage of the vehicle, expose the vehicle to potential damage (e.g., a collision, a punctured tire, and/or an impact from debris), consume a portion of the limited operational lifespan of the parts of the vehicle, and/or decrease the overall value of the vehicle, among other examples. Moreover, a user may test drive a vehicle (e.g., consuming fuel, increase the mileage of the vehicle, and/or exposing the vehicle to potential damage) and may then decide not to purchase the vehicle, resulting in the fuel and/or mileage being consumed for no benefit to the owner of the vehicle.

A device having extended reality (XR) capabilities (e.g., a VR device, an augmented reality (AR) device, and/or a mixed reality device) may be capable of generating and/or displaying a virtual environment to simulate the driving experience of a vehicle. However, test driving a vehicle is a personal and individualized experience. For example, an individual may wish to test drive a vehicle in an environment with which they are familiar to get a sense of the look, feel, and movement of the vehicle on roads and in environments that the individual has driven on in the past (e.g., to allow the individual to compare the test driving experience to previous driving experiences in that environment or on those roads). However, because the virtual environment displayed by the device may be generated prior to a session of the virtual environment being initiated on the device, it may be difficult to allow an individual to choose a specific environment in which they would like to virtually test drive the vehicle.

For example, virtual environments for a VR device may be generated using 3D models that are created to simulate a given environment. The models may be generated or constructed in advance (e.g., by a developer) to ensure that a realistic model is generated to simulate the given environment. Therefore, to accommodate the vast number of environments that an individual may wish to virtually test drive a vehicle in (e.g., an individual may wish to test drive a vehicle on any road that exists) would consume significant processing resources, memory resources, computing resources, and/or developer time, among other examples. For example, models of roads and/or associated environments for a vast number of roads would need to be generated (e.g., by developers) in advance of deploying the virtual environment to allow a user to select the road and/or environment in which they wish to virtually test drive the vehicle (e.g., with which they are familiar).

Moreover, a viewpoint for an individual driving a vehicle may be different for different vehicles. For example, a seat height for a truck may be higher than a seat height for a sedan, therefore the viewpoint from which the individual views the environment while driving the truck is different than the viewpoint from which the individual views the same environment while driving the sedan. As a result, to create realistic virtual driving environments for different vehicles may require different models of the same environment (e.g., the same road) to be created for different vehicles. This compounds the problems discussed above and may consume additional processing resources, memory resources, computing resources, and/or developer time, among other examples.

Some techniques and apparatuses described herein enable dynamic generation of scenery for a virtual reality driving session based on route information. For example, a user (e.g., via an interactive display of a VR device) may provide route information for a virtual test driving session. A model generation device and/or the VR device may generate a realistic virtual environment for the virtual test driving session based on the route information. For example, the virtual environment may be generated dynamically and/or on demand based on the route information and/or a vehicle selected by the user.

For example, the model generation device and/or the VR device may identify latitude and/or longitude coordinates associated with the route information. The model generation device and/or the VR device may identify topographical information (e.g., elevation information) associated with the route based on the identified latitude and/or longitude coordinates. The model generation device and/or the VR device may generate a model of the route (e.g., a model of the road on which the user wishes to drive) that includes an accurate horizontal (e.g., left and right) model of the route as well as an accurate vertical (e.g., up and down) model of the route (e.g., to capture and realistically simulate elevation changes along the route).

The model generation device and/or the VR device may dynamically generate scenery for the route based on one or more images of the route. For example, the model generation device and/or the VR device may obtain images based on the route information. The images may be from multiple different angles. For example, the model generation device and/or the VR device may obtain top down satellite images of the route and/or may obtain street-view images of the route (e.g., images captured from street level), among other examples. The model generation device and/or the VR device may use a machine learning model (e.g., a convolutional neural network (CNN) model or another machine learning model) to identify objects in the one or more images, such as buildings, signs, trees, bushes, fences, light posts, and/or power lines, among other examples. The model generation device and/or the VR device may generate models for each identified object based on identifying the object and/or based on an image of the object. The model generation device and/or the VR device may place the modeled objects within the generated model of the route in accurate locations based on the images of the route. As a result, processing resources, memory resources, computing resources, and/or developer time, among other examples, may be conserved that would have otherwise been used to generate the model(s) of the virtual environment for the route prior to receiving the route information from the user (e.g., because model(s) for a vast number of routes or areas would have otherwise need to be created because the route information that would be selected would not be known).

The model generation device and/or the VR device may determine a visual reference point for the virtual test driving session based on vehicle information for a vehicle selected by the user. For example, the model generation device and/or the VR device may place a visual reference point for the virtual test driving session based on a location from which the user would view the environment sitting in the vehicle. For example, the model generation device and/or the VR device may determine a distance from ground level and/or a distance from the front of the vehicle where the user's eyes would be if the user were sitting in the vehicle. The model generation device and/or the VR device may place a visual reference point for the virtual test driving session in a similar location as a location where the user's eyes would be if the user were sitting in the vehicle. As a result, a realistic visual reference point for the virtual test driving session may be created for a wide range of vehicles. The model generation device and/or the VR device may place a model of the vehicle in the generated model of the route. The model generation device and/or the VR device may place the reference point of the user (in the virtual test driving session) at the determined visual reference point. As a result, a realistic virtual environment may be created to allow a user to experience driving the vehicle (e.g., from an accurate and realistic viewpoint) in an environment that is familiar and/or recognizable to the user.

Additionally, this may conserve processing resources, memory resources, computing resources, and/or developer time, among other examples, that would have otherwise been used generating virtual environments for a large number of routes or areas (e.g., to allow a user to select an environment or route that they are familiar with for the virtual test driving session). For example, a realistic virtual environment with scenery may be generated for a virtual test driving session in an on-demand manner based on route information and/or a selected vehicle indicated by the user. This may allow the user to experience the look and feel of the vehicle in an environment in which the user is comfortable and/or in a simulated environment that the user recognizes and/or is familiar with. Moreover, this may reduce the need for the user to perform an actual test drive of the vehicle, thereby conserving fuel, reducing a mileage on the vehicle, reducing a risk of potential damage (e.g., a collision, a punctured tire, and/or an impact from debris) to the vehicle, conserve a portion of the limited operational lifespan of the parts of the vehicle, and/or preserve the overall value of the vehicle, among other examples, that would have otherwise been used or consumed via a test drive of the vehicle.

FIGS. 1A-1E are diagrams of an example 100 associated with dynamically generating scenery for a virtual reality driving session based on route information. As shown in FIGS. 1A-1E, example 100 includes a VR device, a model generation device, and one or more data sources. These devices are described in more detail in connection with FIGS. 2 and 3. In some implementations, the VR device and the model generation device may be co-located (e.g., the model generation device may be included in the VR device). In some other implementations, the VR device and the model generation device may be separate devices.

Although examples may be described herein in connection with VR techniques, the systems and methods described herein may be applied to any virtual or XR techniques, such as AR techniques and/or mixed reality techniques, among other examples. For example, AR may generally refer to interactive technologies in which objects in a real-world environment are augmented using computer-generated virtual content that may be overlaid on the real-world environment. "Mixed reality," sometimes referred to as "hybrid reality," similarly merges real and virtual worlds to produce a visual environment in which real physical objects and virtual digital objects can co-exist. However, in addition to overlaying virtual objects on the real-world environment, mixed reality applications often anchor the virtual objects to the real world and allow users to interact with the virtual objects. "Virtual reality" or "VR" refers to fully immersive computer-generated experiences that take place in a simulated environment, often incorporating auditory, visual, haptic, and/or other feedback mechanisms. XR is an umbrella term that encompasses AR, mixed reality, and/or VR, among other examples.

As shown in FIG. 1A, and by reference number 102, the model generation device may transmit, and the VR device may receive, user interface information. The user interface information may cause a user interface to be displayed by the virtual reality device. For example, the user interface information may include information for one or more user interfaces associated with a virtual reality driving session. As shown by reference number 104, the VR device may display the one or more user interfaces via a display of the VR device (e.g., based on receiving the user interface information). The one or more user interfaces may be displayed in a virtual environment being displayed by the VR device. For example, the VR device may track user movements and may cause an avatar or other virtual depiction of the user to move in the virtual environment based on the user movements. Therefore, the user may be enabled to view hand or arm movements of the user in the virtual environment to enable the user to make one or more selections via the user interface(s).

As shown in FIG. 1A, the one or more user interfaces may include a vehicle selection interface and a route selection interface. The vehicle selection interface may enable a user to select a vehicle, from a set of vehicles, for the VR driving session. For example, the vehicle selection interface may display a set of vehicles (e.g., vehicle A, vehicle B, and vehicle C, as shown in FIG. 1A). In some implementations, the vehicle selection interface may include a search input to enable the user to input search terms for a vehicle. The vehicle selection interface may enable the user to browse different vehicles that are available for selection for the VR driving session. In some implementations, the vehicle selection interface may include an image of each vehicle and/or vehicle information (e.g., manufacturer, make, model, and/or year, among other examples).

In some implementations, the set of vehicles available for selection via the vehicle selection interface may be based on an inventory of one or more dealerships. For example, the model generation device and/or the VR device may identify one or more dealerships associated with the user (e.g., selected by the user and/or within a geographic proximity to the user). The model generation device and/or the VR device may identify an inventory (e.g., of vehicles available for purchase) of the one or more dealerships. The model generation device and/or the VR device may cause the vehicle selection interface to cause the vehicles included in the inventory of the one or more dealerships to be available for selection via the vehicle selection interface.

Additionally, or alternatively, the set of vehicles available for selection via the vehicle selection interface may be based on a vehicle model database associated with the VR device and/or the model generation device. For example, the model generation device may generate and/or receive virtual models for one or more vehicles. The virtual models may be based on information provided by a manufacturer of the vehicle and/or images of the vehicle. The model generation device may store the one or more virtual models in the vehicle model database. Therefore, the set of vehicles available for selection via the vehicle selection interface may be based on the one or more virtual models stored in the vehicle model database (e.g., such that the user is only allowed to select vehicles for which the model generation device is capable of generating and/or retrieving virtual models). In some implementations, the models of the vehicles may be based on generic models. For example, the vehicle model database may store a generic four-door sedan model. The model generation device may use the generic four-door sedan model to generate a realistic model for a given vehicle (e.g., that is a four-door sedan) using texturing and/or layering based on images of the given vehicle, as described in more detail elsewhere herein. The user interface information may include information for vehicles for which the model generation device is capable of generating or retrieving virtual models, as described in more detail elsewhere herein.

The route selection interface may enable a user to select a route for the VR driving session. For example, the route selection interface may display a map (e.g., showing roads and/or buildings or other objects along the roads). The route selection interface may enable a user to select a route on which the user wishes to drive during the VR driving session. For example, as shown in FIG. 1A (e.g., by the bold line on the map), the user may select one or more roads and/or a direction of travel along the one or more roads for the VR driving session. In some implementations, the route selection interface may enable a user to search for a location (e.g., by entering an address, a city, a town, and/or a zip code). The VR device may cause the route selection interface to display a map of the location. Additionally, or alternatively, the VR device may identify a current location of the VR device (e.g., using global positioning system (GPS) information) and may display a map of the current location. The user may interact with the route selection interface to view an area of interest on the displayed map (e.g., the user may move the displayed map to different areas and/or may zoom in or zoom out on given areas to view the area of interest). The user may interact with the route selection interface to provide the selected route for the VR driving session.

The VR device may detect and/or identify one or more user inputs based on user interactions with the one or more user interfaces displayed by the VR device. For example, the VR device may detect and/or identify a selection of a vehicle from the vehicle selection interface. Similarly, the VR device may detect and/or identify route information for the selected route based on the user interaction with the route selection interface. For example, the user may interact with a user interface of the VR device (e.g., by moving the user's hand, and/or tapping the user interface in the VR environment in which the user interface is displayed, among other examples). The VR device may track user movements (e.g., via a camera device, an input device (e.g., a controller), and/or a VR glove, among other examples) to detect the user inputs. In some implementations, the user inputs may be indicated via a controller (e.g., a user may push a button on a physical controller when a user selection is made).

As shown by reference number 106, the VR device may transmit, and the model generation device may receive, an indication of a selected vehicle and/or route information for the VR driving session. For example, the VR device may transmit, and the model generation device may receive, an indication of a vehicle to be associated with the VR driving session. Similarly, the VR device may transmit, and the model generation device may receive, the route information associated with a route to be associated with the VR driving session. The route information may include geographic coordinate information (e.g., longitude and/or latitude coordinates) for the route. For example, the VR device may receive the selected route and may determine the geographic coordinate information based on the selected route.

Figure 1B:
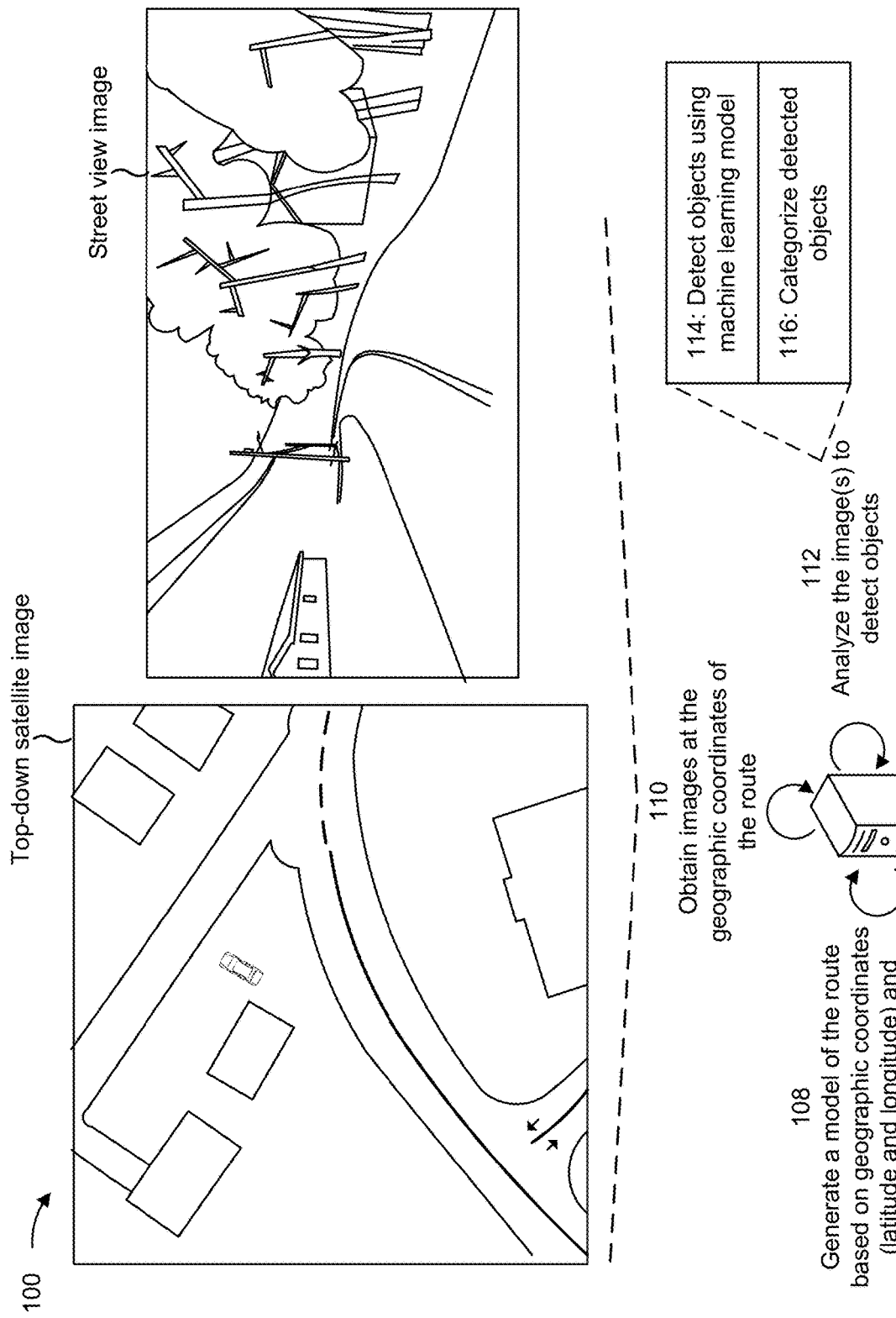

As shown in FIG. 1B, and by reference number 108, the model generation device may generate a model associated with the route based on the geographic coordinate information and based on topographical information associated with the geographic coordinate information. For example, the model generation device may use the geographic coordinate information (e.g., the latitude and longitude of points along the route) to identify topographical information (e.g., elevation information) along the route. The model generation device may model the route (e.g., the road) by modeling horizontal changes in the route (e.g., left and right or latitude and longitude changes) and by modeling vertical changes in the route (e.g., elevation or topographical changes). This may enable the model generation device to create an accurate three-dimensional model of the route (e.g., of the road(s)) selected by the user. For example, the model generation device may analyze or identify topographical or elevation changes along the route selected by the user to enable the model generation device to generate an accurate three-dimensional model of the route (e.g., with no objects or any other items included in the model). The model generation device may generate a three-dimensional model of the route based on the topographical information associated with the geographic coordinate information (e.g., the topographical information may indicate relative elevations associated with different points along the route). In other words, the model associated with the route may be a blank model that simulates only the latitude and longitude and the elevation changes associated with the route. The model generation device may dynamically add scenery to the blank model to simulate the environment of the selected route by adding different models of objects along the route, as explained in more detail elsewhere herein.

In some implementations, the model generation device may first create a two-dimensional mapping of the route based on the geographic coordinate information associated with the route. For example, the model generation device may use latitude and/or longitude coordinates of points along the route to map, in a two-dimensional space, the route (e.g., mapping roads and/or other objects along the route). After the two-dimensional mapping of the route is completed, the model generation device may transform the two-dimensional mapping into a three-dimensional model of the route by incorporating topographical information associated with the route (e.g., to incorporate elevation changes along the route). This may create a realistic three-dimensional model of the route based on the route information.

As shown by reference number 110, the model generation device may receive or obtain one or more images associated with the route information. For example, the one or more images may be images at the geographic coordinates associated with the route. In some implementations, the one or more images may include a first one or more images associated with a first view of the route and a second one or more images associated with a second view of the route. In other words, the model generation device may receive or obtain images of the route from at least two different views. This may enable the model generation device to accurately model and place objects along the route to dynamically create the scenery associated with the route, as explained in more detail elsewhere herein.

For example, as shown in FIG. 1B, the one or more images may include top-down images. The top-down images may be satellite images or other images taken from above the route. The top-down images may enable the model generation device to identify or detect objects (e.g., buildings, trees, plants, and/or signs, among other examples) located along the route. Additionally, the top-down images may enable the model generation device to identify locations (e.g., longitude and/or latitude locations) of the objects located along the route.

In some implementations, the one or more images may include street view images. "Street view" images may be images captured from ground level or slightly above ground level. Street view images may also be referred to as street level view images and/or perspective view images. For example, whereas top-down images provide a top view of the route, street view images may provide a perspective view of the route (e.g., portraying height, width, and/or depth of objects along the route). Both top-down images and street view images may be needed because the top-down images provide geographic positioning of objects along the route and the street view images provide perspective (e.g., height, width, and/or depth) of objects along the route. Therefore, using images from at least two different views may enable the model generation device to generate a more realistic model of the route.

In some implementations, the model generation device may receive the one or more images from a data source (e.g., a database and/or another data source). For example, the data source may include images from a plurality of different locations or coordinates. In some implementations, the data source may be a mapping or imaging service that provides satellite and/or street view images for a plurality of different locations or coordinates. The model generation device may obtain or pull images from the data source based on the geographic coordinate information associated with the route. In some implementations, the route information may include street names or street addresses. The model generation device may search the data source for images based on the geographic coordinate information, street names, and/or street addresses, among other examples, associated with the route.

In some implementations, the model generation device may receive or obtain the one or more images via an automated web-based interaction, such as a web scraping interaction or a web harvesting interaction, among other examples. For example, the model generation device may perform web scaping to extract images from different websites associated with the route. The websites may be web mapping platforms (e.g., Google Maps®). The model generation device may extract freely available (e.g., free to use) images provided by web mapping platforms to obtain the one or more images associated with the route.

The one or more images may be periodically updated (e.g., by a web mapping platform or by another service that provides the one or more images) such that the one or more images depict a relatively recent view of the route. For example, the model generation device may obtain the most recently available images associated with the route to ensure that the dynamically generated model of the route simulates the route as accurately as possible.

As shown by reference number 112, the model generation device may analyze the one or more images to detect objects included in the one or more images. For example, the model generation device may identify one or more objects associated with the route based on the one or more images. As used herein, "object" may refer to any object that is located proximate to the route selected by the user. For example, an object may include a building, a tree, a plant, a sign, a road feature (e.g., a road median, a traffic barrier, and/or a traffic light), a light pole, a power line, a fence, a landscaping feature (e.g., a fountain and/or a statue), and/or any other object that is located along the route as depicted in the one or more images. The model generation device may use an image recognition technique, a computer vision technique, a machine learning technique, and/or an object detection technique, among other examples, to identify the one or more objects.

For example, as shown by reference number 114, the model generation device may detect objects (e.g., in the one or more images) using a machine learning model, such as a CNN model. The machine learning model may be trained to recognize objects in images of routes using a set of training images. The training images may be top-down images and/or street view images. For example, a user of another device may mark objects (e.g., may place an indication of the objects in the training images) in the training images and the machine learning model may be trained to detect and/or recognize the objects. In some implementations, the machine learning model may be trained to categorize the detected objects. For example, different categories may include buildings, plants, trees, signs, road features, among other examples. The categorization of the objects may enable the model generation device to quickly identify a generic or blank model (e.g., a template model) to be used to generate a model for the object, as explained in more detail elsewhere herein.

The model generation device may input the one or more images into the trained machine learning model. The trained machine learning model may output an indication of identified objects included in the one or more images. For example, the machine learning model may place an indication of detected objects in each image. In some implementations, the machine learning model may input a bounding box around each object detected in each image. As a result, the model generation device may be enabled to identify the one or more objects and may identify locations of the one or more objects in the images.

In some implementations, the model generation device may correlate a detected object across multiple images. For example, the same object may be included in multiple images obtained by the model generation device. The model generation device may identify when two or more images include the same object. For example, the model generation device may identify that the two or more objects are of the same, or similar, geographic location. Additionally, or alternatively, the model generation device may identify, based on analyzing the images, that the object depicted in two or more images is the same. By identifying that two or more images include an image of the same object, the model generation device may avoid creating multiple models of the same object to be placed in the scenery for the model of the route. Additionally, by identifying that two or more images include an image of the same object, the model generation device may generate a more accurate and/or realistic model of the object because the two or more images may provide different views and/or perspectives of the object, thereby enabling the model generation device to obtain more information and/or details associated with the object.

As shown by reference number 116, the model generation device may categorize detected objects into one or more categories. For example, the model generation device may analyze, using a machine learning model, the one or more images. The model generation device may detect, using the machine learning model, an object included in the one or more objects based on analyzing the one or more images. The model generation device may classify, using the machine learning model, the object into one or more categories to enable a model of the object to be generated, as explained in more detail elsewhere in. For example, an object detected in an image may be classified into one or more categories or sub-categories. For example, a detected object may be a two-story home. The object may be categorized into a category of buildings, homes, residential homes, two-story buildings, and/or two-story homes, among other examples. In some implementations, the object may be classified based on a type or model associated with the object. For example, the two-story home may be classified as a colonial house, a split-level house, a ranch house, a raised ranch house, and/or a Cape Cod house, among other examples. Each object detected by the model generation device may be classified into a category (e.g., building or house) and/or one or more sub-categories (e.g., two-story building and/or colonial house). The categories and/or sub-categories may enable the model generation device to quickly identify template or blank models to be used to generate a model of the object.

In some implementations, identifying and/or detecting the one or more objects may include identifying geographic locations of the one or more objects relative to the route. For example, the model generation device may identify a geographic location of each identified object. The model generation device may identify the geographic location of an object based one or more images (e.g., from the image(s) obtained by the model generation device). For example, the model generation device may identify a location of an object relative to a road associated with the route. This may enable the model generation device to place a model of the object in the virtual environment in a location that is accurate (e.g., to improve the realism of the simulation provided by the virtual environment). In some implementations, the model generation device may identify the geographic locations of each identified object using top-down images and/or satellite images associated with the route.

In some implementations, identifying and/or detecting the one or more objects may include identifying three-dimensional spatial information of the one or more objects relative to the route. For example, the model generation device may identify a height, a depth, and/or a width of each identified object. The model generation device may identify spatial information for each object relative to a road associated with the route. In other words, the model generation device may identify a height, a depth, and/or a width of each identified object as viewed from a road associated with the route. This may enable the model generation device to generate and/or modify a model of an object to be a realistic size and/or shape when placed in the virtual environment. In some implementations, the model generation device may identify the three-dimensional spatial information of the one or more objects relative to the route based on street view images or other perspective view images associated with the route.

Figure 1C:
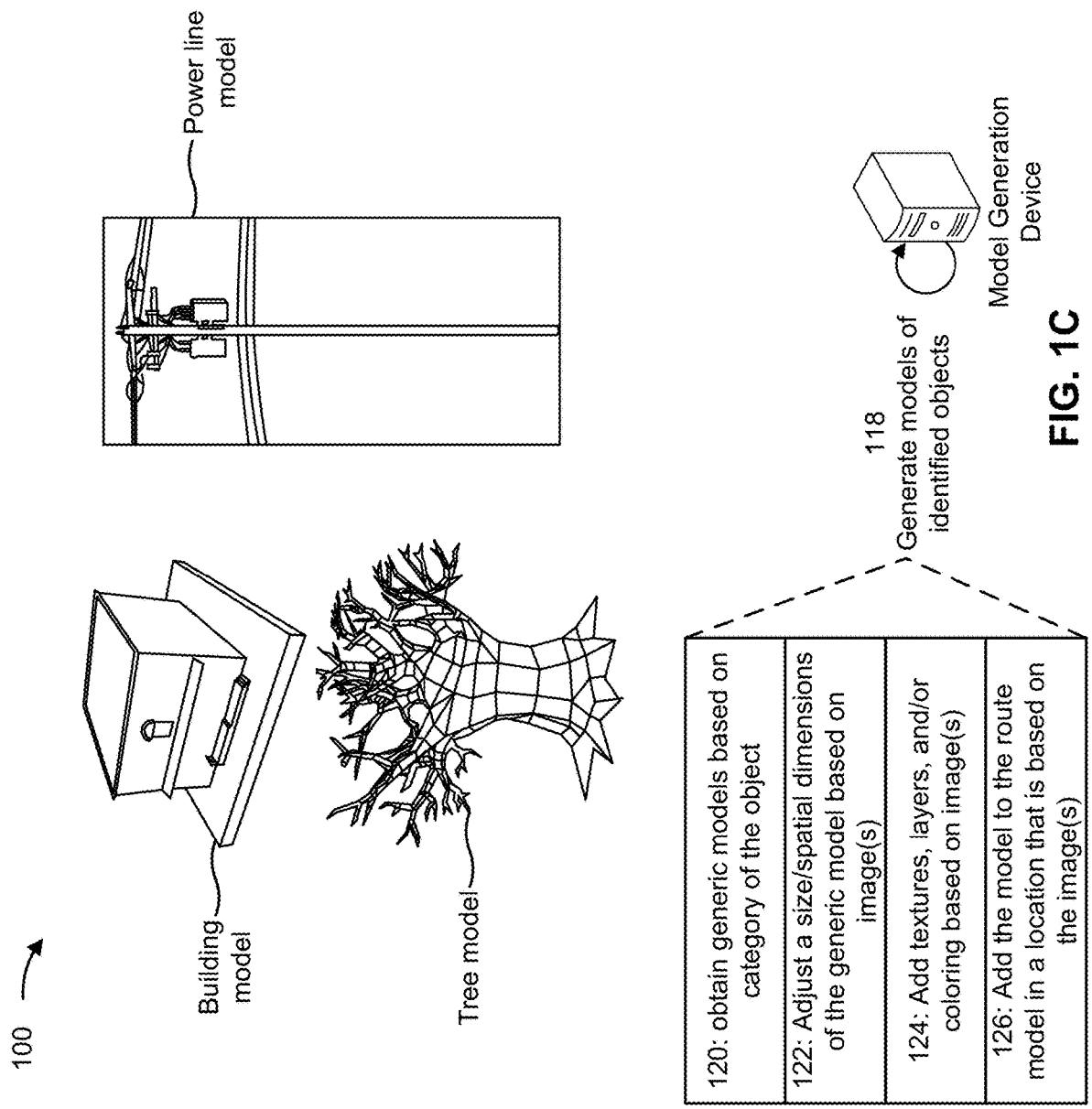

As shown in FIG. 1C, and by reference number 118, the model generation device may generate models (e.g., virtual models and/or computer generated models) of each identified object. The model generation device may generate the models based on information identified and/or extracted from the one or more images, as described in more detail elsewhere herein. In some implementations, the model generation device may generate a model for each identified object based on the three-dimensional spatial information identified from the one or more images. The model generation device may generate a model for an object based on identifying what the object is (e.g., a house, a tree, a building, or a sign) and/or a category (and/or sub-category) associated with the object (e.g., identified by the model generation device using a machine learning model, as described above).

For example, as shown by reference number 120, the model generation device may obtain generic or template models based on a category of an object. The model generation device may create and/or store template models for different categories of objects. For example, a template model for a house, a tree, a building, a power line, and/or a road feature, among other examples, may be generated and/or stored by the model generation device (e.g., in a template model database). In this way, the model generation device may use a template model for an identified object. For example, if the identified object is a two-story colonial house, then the model generation device may obtain a template model for two-story colonial houses. As another example, if the identified object is an oak tree, then the model generation device may obtain a template model for oak trees. This may conserve resources that would have otherwise been used to generate the models (e.g., from nothing) each time a virtual environment is created for a VR driving session.

In some implementations, as shown by reference number 122, the model generation device may adjust or modify a size or spatial dimensions of a generic model based on the image(s) obtained by the model generation device. For example, the model generation device may determine a size or shape of the object based on the one or more images, as described above. The model generation device may adjust a shape or size of the template model based on the determined size or shape of the object (e.g., to create a more realistic model of the object). In this way, when the model is placed in the virtual environment, the size and shape of the object as viewed from the road and/or from a vehicle in the virtual environment may be accurate with respect to how the object would be viewed while driving on the actual route (e.g., thereby creating a more realistic VR driving experience).

In some implementations, as shown by reference number 124, the model generation device may add layering, may perform three-dimensional texturing, and/or may add different colors to the object model (e.g., the model of the object). For example, the model generation device may extract one or more images of the object from the one or more images. The model generation device may layer and/or perform three-dimensional texturing to add the image(s) of the object to the object model. For example, the model generation device may add a texture layer to an object model. The texture layer may be based on an image of an object (e.g., obtained from the one or more images). In other words, the model generation device may wrap a two-dimensional image of the object around the three-dimensional object model. This may enable the model generation device to create object models that are spatially or dimensionally accurate (e.g., are an accurate size and shape) and also to create object models that look like the actual objects (e.g., by layering or wrapping two-dimensional image(s) on the three-dimensional object model).

As shown by reference number 126, the model generation device may add the models of the one or more objects to the three-dimensional model of the route based on the geographic locations of the one or more objects. For example, as described above, the model generation device may generate a three-dimensional model of the route based on the geographic coordinate information and/or topographical information associated with the route. The model generation device may add model objects to the three-dimensional model of the route in locations that are spatially accurate (e.g., based on the one or more images). For example, as described above, the model generation device may identify a geographic location of each object, identified in the one or more images, relative to the route. After generating an object model for an object, the model generation device may add the object model to the three-dimensional model of the route based on the identified geographic location of the object relative to the route. In this way, the model generation device may dynamically build scenery for the route by placing object models (e.g., generated as described above) in accurate locations in the three-dimensional model of the route. This may create a realistic driving simulation of the route because the object models may have a realistic look and size and are placed in accurate locations relative to a road associated with the route. The model generation device may generate and add object models to the three-dimensional model of the route for each identified object associated with the route to build the scenery for the route in the virtual environment.

Figure 1D:
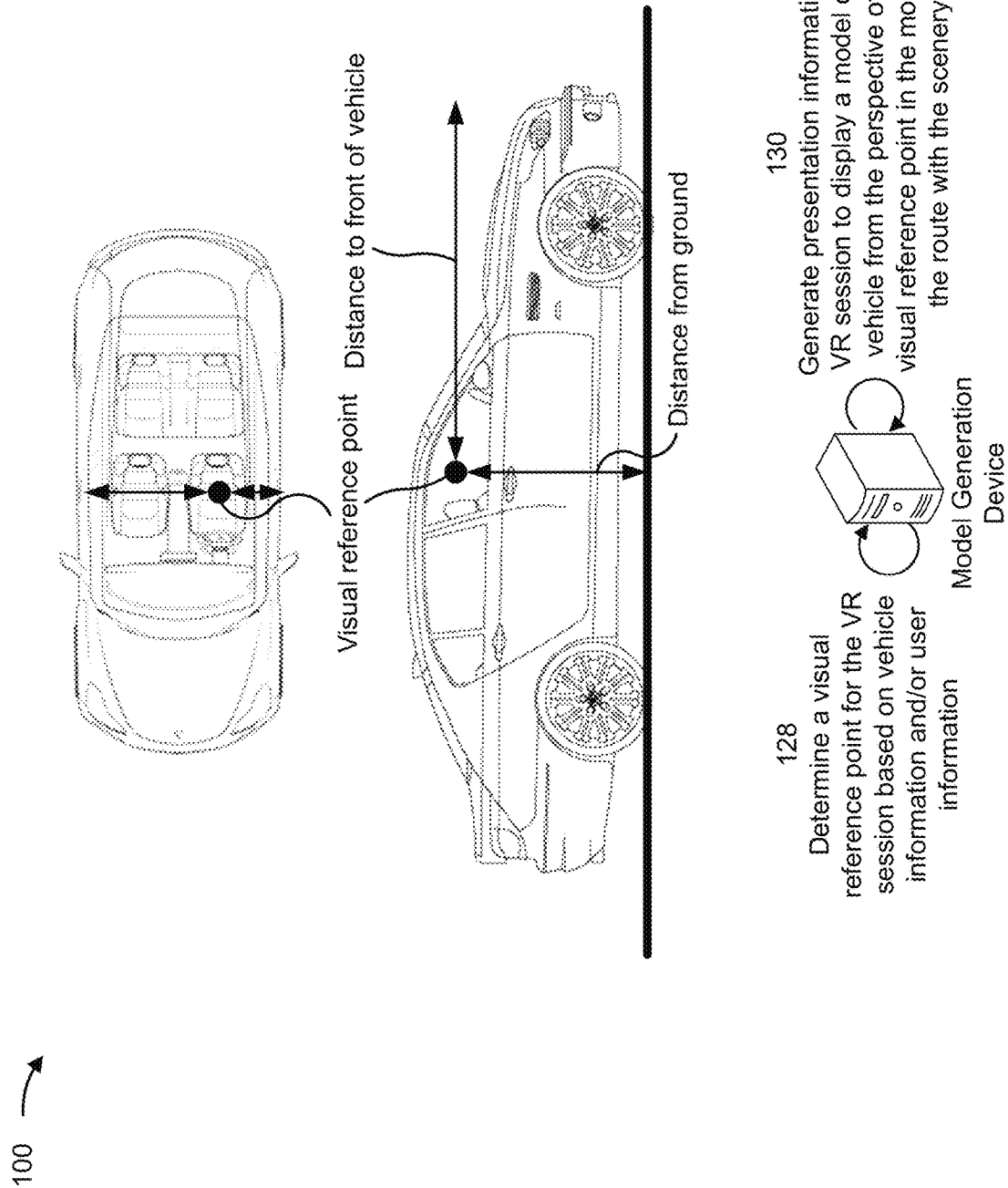

As shown in FIG. 1D, and by reference number 128, the model generation device may determine a visual reference point for the virtual reality driving session. The visual reference point may be a viewpoint from which the virtual environment, generated by the model generation device, will be displayed to a user by the VR device (e.g., the visual reference point may be a viewpoint seen by a user when viewing the virtual environment via the VR device). The model generation device may determine the visual reference point to simulate a viewpoint of the user when driving the selected vehicle for the VR driving session. For example, the visual reference point for the virtual driving session may be based on a location from which the user would view the environment sitting in the selected vehicle (e.g., in the real world).

For example, the model generation device may receive vehicle information associated with the vehicle selected by the user (e.g., as described in connection with FIG. 1A). The vehicle information may be stored in a data source (e.g., and the model generation device may obtain the vehicle information from the data source based on receiving the indication of the selected vehicle). The vehicle information may indicate dimensions and/or other information associated with the vehicle. For example, the vehicle information may indicate a seat height for seats of the vehicle (e.g., indicating a distance between the seat and the ground). In some implementations, the vehicle information may indicate a distance between a seat and a front of the vehicle. In some implementations, the vehicle information may indicate a distance between a seat and each side of the vehicle. The model generation device may use the vehicle information to place the visual reference point in a position that simulates the user sitting in a seat of the vehicle.

For example, as shown in FIG. 1D, the visual reference point may be based on a distance relative to the ground level. The distance relative to the ground level may be based on a seat height and a height of a user in a seated position. For example, the distance from the ground level may be the seat height plus the height of the user in a seated position. In some implementations, the height of the user in a seated position may be a fixed value (e.g., that is based on an average seated height for users). In some implementations, the height of the user in a seated position may be based on user information. For example, the user may input (e.g., via the one or more user interfaces displayed by the VR device) the user information. The VR device may provide the user information to the model generation device. The user information may indicate a height of the user (e.g., a user height) or a seated height of the user. The model generation device may use the user information (e.g., the user height of the user may be used to determine a seated height of the user) to determine the distance from the ground level for the visual reference point.

In some implementations, the model generation device may determine a distance relative to a front position of the vehicle (e.g., a seat distance from the front position of the vehicle). The distance from the front end of the vehicle may be used by the model generation device to place the visual reference point in the virtual environment relative to a front end of a vehicle model (e.g., a virtual model or a computer generated model of the vehicle). The distance from the front end of the vehicle may be a distance between the front end of the vehicle and a seat of the vehicle (e.g., a center of a seat of the vehicle). The distance from the front end of the vehicle may be indicated by, or may be determined based on, the vehicle information associated with the vehicle. In some implementations, the seat may be a driver seat (e.g., a seat positioned behind a steering wheel). In some implementations, the seat may be another seat, such as a passenger seat or a back seat (e.g., if the selected vehicle has two or more rows of seats).

As shown in FIG. 1D, the model generation device may determine a distance from each side of the vehicle to the seat. For example, the model generation device may place the visual reference point in the center of a seat relative to each side of the vehicle. The distance from each side of the vehicle to the seat may be indicated by, or may be determined based on, the vehicle information associated with the vehicle. In this way, the model generation device may determine the location of the visual reference point, for the VR driving session, to accurately simulate a viewpoint of a user sitting in the selected vehicle.

In some implementations, the seat associated with the visual reference point may be the driver seat. In some implementations, a user input may select the seat. For example, a user may select the driver seat, a passenger seat, a back seat, or another seat. The model generation device may determine the visual reference point for the VR driving session based on the selected seat. In this way, a user may experience the look and feel of a vehicle, in an environment and/or along a route with which they are familiar, from different seats in the vehicle. In some implementations, multiple VR devices may be linked such that a first user may view the virtual environment of the VR division session from a first visual reference point (e.g., that is based on a first seat of the vehicle) and a second user may view the virtual environment of the VR division session from a second visual reference point (e.g., that is based on a second seat of the vehicle).

As shown by reference number 130, the model generation device may generate presentation information for the VR driving session. The presentation information, when provided to the VR device, may cause the VR driving session to be displayed by the VR device from a perspective of the visual reference point within a vehicle model associated with the selected vehicle placed in the virtual environment generated by the model generation device (e.g., in the model of the route with the dynamically generated scenery). For example, the model generation device may generate, receive, and/or obtain the vehicle model (e.g., a virtual model and/or computer generated model) of the vehicle selected by the user. For example, the model generation device may store vehicle models for a set of vehicles (e.g., the set of vehicles made available for selection via the vehicle selection interface and/or other vehicles) in a data source (e.g., in a vehicle model database). The model generation device may obtain the vehicle model from the vehicle model database based on the selected vehicle indicated by the user.

In some implementations, the vehicle model may be a generic or template model. For example, the selected vehicle may be a specific make and manufacturer for a two-door sedan. The vehicle model may be a template model for two-door sedans, but may not be specific to the make and manufacturer of the selected vehicle. The model generation device may modify the template model to simulate the selected vehicle by modifying dimensions and/or by applying layering and/or texturing (e.g., in a similar manner as described in connection with the generation of the object models). This may conserve resources (e.g., processing resources and/or memory resources) that would have otherwise been used to generate and/or store vehicle models for a plurality of vehicles (e.g., specific to different makes and manufacturers). In some other implementations, the vehicle model may be specific to the make and manufacturer for the selected vehicle. For example, the model generation device may generate and/or store vehicle models that are specific to a given vehicle (e.g., specific to a make, year, and/or manufacturer of the vehicle).

The model generation device may place the vehicle model in the three-dimensional model of the route (e.g., with the added object models). The model generation device may place the vehicle on a road associated with the route. The model generation device may place the visual reference point for the VR driving session inside the vehicle model in a location as described above. The model generation device may generate the presentation information to cause the vehicle model and/or the visual reference point to move along the selected route (e.g., along one or more roads, as indicated by the user via the route selection interface). For example, the model generation device may generate the presentation information to simulate the vehicle model driving along the selected route. Because the model generation device has dynamically generated scenery for the route (e.g., by adding object models to a three-dimensional model of the route, as described above), the presentation information may cause a VR driving session to be displayed that simulates the look and feel of driving in the vehicle along the route selected by the user.

As shown in FIG. 1E, and by reference number 132, the model generation device may transmit, and the VR device may receive, the presentation information. As shown by reference number 134, the reception of the presentation information may cause the VR device to display the VR driving session. For example, the VR device may display a virtual environment from the perspective of the visual reference point. As described elsewhere herein, the virtual environment may be a three-dimensional virtual environment that includes a vehicle model of a vehicle selected by the user. Additionally, the virtual environment may include a three-dimensional model of the route selected by the user. The three-dimensional model of the route may include scenery that was dynamically generated by the VR device and/or the model generation device, as described in more detail elsewhere herein. For example, the three-dimensional model of the route may include object models that accurately depict objects along the selected route (e.g., object models that look like the real world objects and that are placed in the virtual environment in accurate locations relative to the route selected by the user).

As a result, a user may view the VR driving session via the VR device to simulate the experience of driving the vehicle in an environment and along a route with which the user is familiar. In some implementations, the user may interact with the virtual environment via the VR device. For example, the VR device may track movements of the user (e.g., via sensors and/or camera devices). The VR device may adjust or change the view of the virtual environment presented to the user based on the movements of the user. For example, if the VR device is a head-mounted device, the VR device may cause a view of the virtual environment presented to the user to change when the user turns their head (e.g., when the user looks to the left, the VR device may cause the view to show the virtual environment to the left).

In some implementations, the model generation device and/or the VR device may receive an indication of a user input that is based on an interaction with a selectable element associated with the vehicle model. The selectable element may be associated with a feature or element of the real-world vehicle that can be selected or manipulated by a user of the vehicle to cause the vehicle to perform an action. For example, the selectable element may be associated with a power window button (e.g., that causes a window of the vehicle to raise or lower), an input to cause a turn signal to be displayed, an input associated with a display of the vehicle (e.g., an entertainment display or an information dashboard of the vehicle), and/or a gear shifter of the vehicle, among other examples. For example, the vehicle model may be generated with one or more selectable elements. The VR device may track a user movement (e.g., a hand movement, an arm movement, and/or a movement of a controller associated with the VR device), such as via a sensor or camera device, to detect when a user interacts with a selectable element of the vehicle model. Based on detecting the user input that is based on the interaction with the selectable element, the VR device and/or the model generation device may determine a display element associated with the vehicle model based on the user input and the vehicle information. For example, the display element may be a window (e.g., when the selectable element is a power window button), and/or a display (e.g., when the selectable element is an input associated with the display), among other examples. The model generation device may transmit, to the VR device, information to cause the display element to be displayed or modified by the VR device. In some implementations, the VR device may cause the display element to be displayed or modified (e.g., as displayed by the VR device in the VR driving session), based on detecting or receiving the user input. For example, if the user input is associated with pushing a power window button to cause a window to lower, the model generation device and/or the VR device may perform an action to cause a window on the vehicle model to be lowered as displayed in the VR driving session. As another example, if the user input is associated with selecting an input associated with a display of the vehicle, the model generation device and/or the VR device may perform an action to cause information to be shown on the display as presented in the VR driving session. In this way, the user may virtually interact with real-world features of the vehicle while viewing the VR driving session.

As a result, a realistic virtual environment may be created to allow a user to experience driving the vehicle (e.g., from an accurate and realistic viewpoint) in an environment that is familiar and/or recognizable to the user. This may reduce or eliminate the cognitive dissonance associated with users completing a transaction for a vehicle before physically sitting in the vehicle and/or before test driving the vehicle. Additionally, this may conserve processing resources, memory resources, computing resources, and/or developer time, among other examples, that would have otherwise been used generating virtual environments for a large number of routes or areas (e.g., to allow a user to select an environment or route that they are familiar with for the virtual test driving session). For example, a realistic virtual environment with scenery may be generated for a virtual test driving session in an on-demand manner based on route information and/or a selected vehicle indicated by the user. This may allow the user to experience the look and feel of the vehicle in an environment in which the user is comfortable and/or in a simulated environment that the user recognizes and/or is familiar with.

As indicated above, FIGS. 1A-1E are provided as an example. Other examples may differ from what is described with regard to FIGS. 1A-1E.

Figure 2:
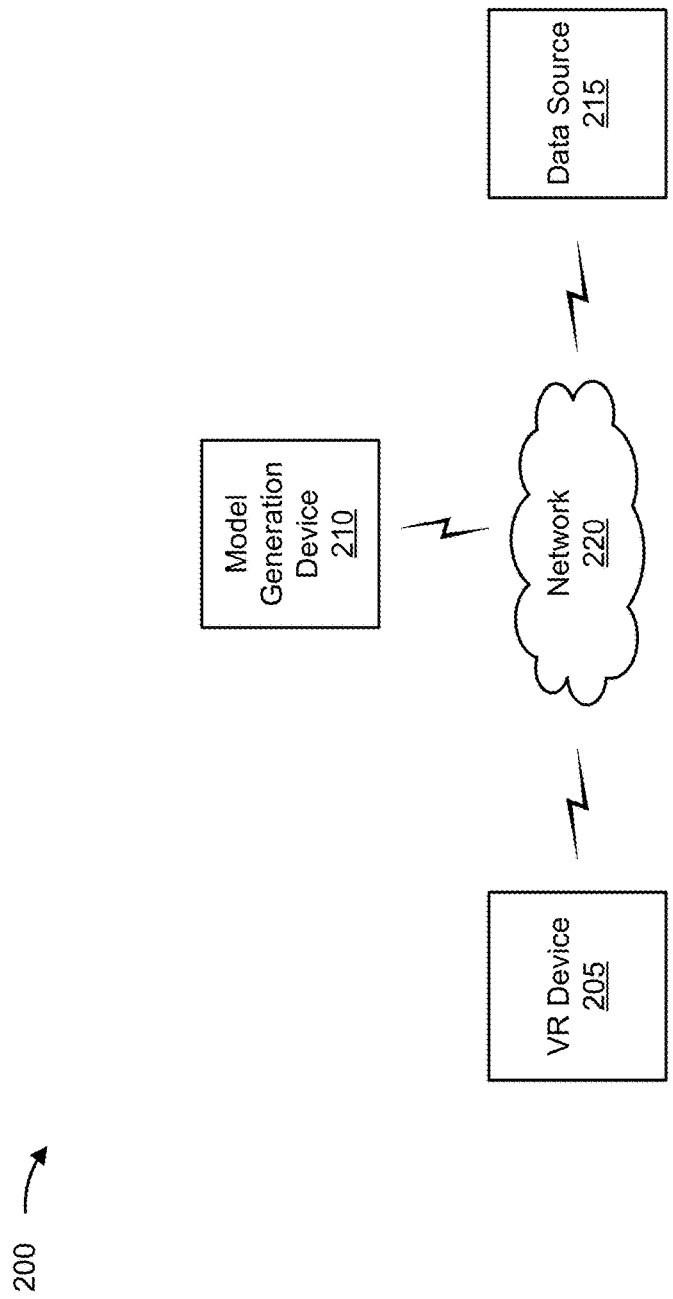
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a VR device 205, a model generation device 210, a data source 215, and a network 220. Devices of environment 200 may interconnect via wired connections, wireless connections, or a combination of wired and wireless connections.

The VR device 205 includes one or more devices capable of receiving, generating, storing, processing, and/or providing information associated with dynamically generating scenery for a virtual reality driving session based on route information, as described elsewhere herein. The VR device 205 may be any device with XR capabilities or VR capabilities. The VR device 205 may include a communication device and/or a computing device. For example, the VR device 205 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), and/or a similar type of device.

The model generation device 210 includes one or more devices capable of receiving, generating, storing, processing, providing, and/or routing information associated with dynamically generating scenery for a virtual reality driving session based on route information, as described elsewhere herein. The model generation device 210 may include a communication device and/or a computing device. For example, the model generation device 210 may include a server, such as an application server, a client server, a web server, a database server, a host server, a proxy server, a virtual server (e.g., executing on computing hardware), or a server in a cloud computing system. In some implementations, the model generation device 210 includes computing hardware used in a cloud computing environment. In some implementations, the model generation device 210 may be a part of, or may be included in, the VR device 205.

The data source 215 includes one or more devices capable of receiving, generating, storing, processing, and/or providing information associated with dynamically generating scenery for a virtual reality driving session based on route information, as described elsewhere herein. The data source 215 may be a data source that stores one or more images, as described elsewhere herein. In some implementations, the data source 215 may be a data source that stores models (e.g., virtual models and/or computer generated models) of vehicles and/or objects, as described elsewhere herein. The data source 215 may include a communication device and/or a computing device. For example, the data source 215 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 215 may communicate with one or more other devices of environment 200, as described elsewhere herein.

The network 220 includes one or more wired and/or wireless networks. For example, the network 220 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
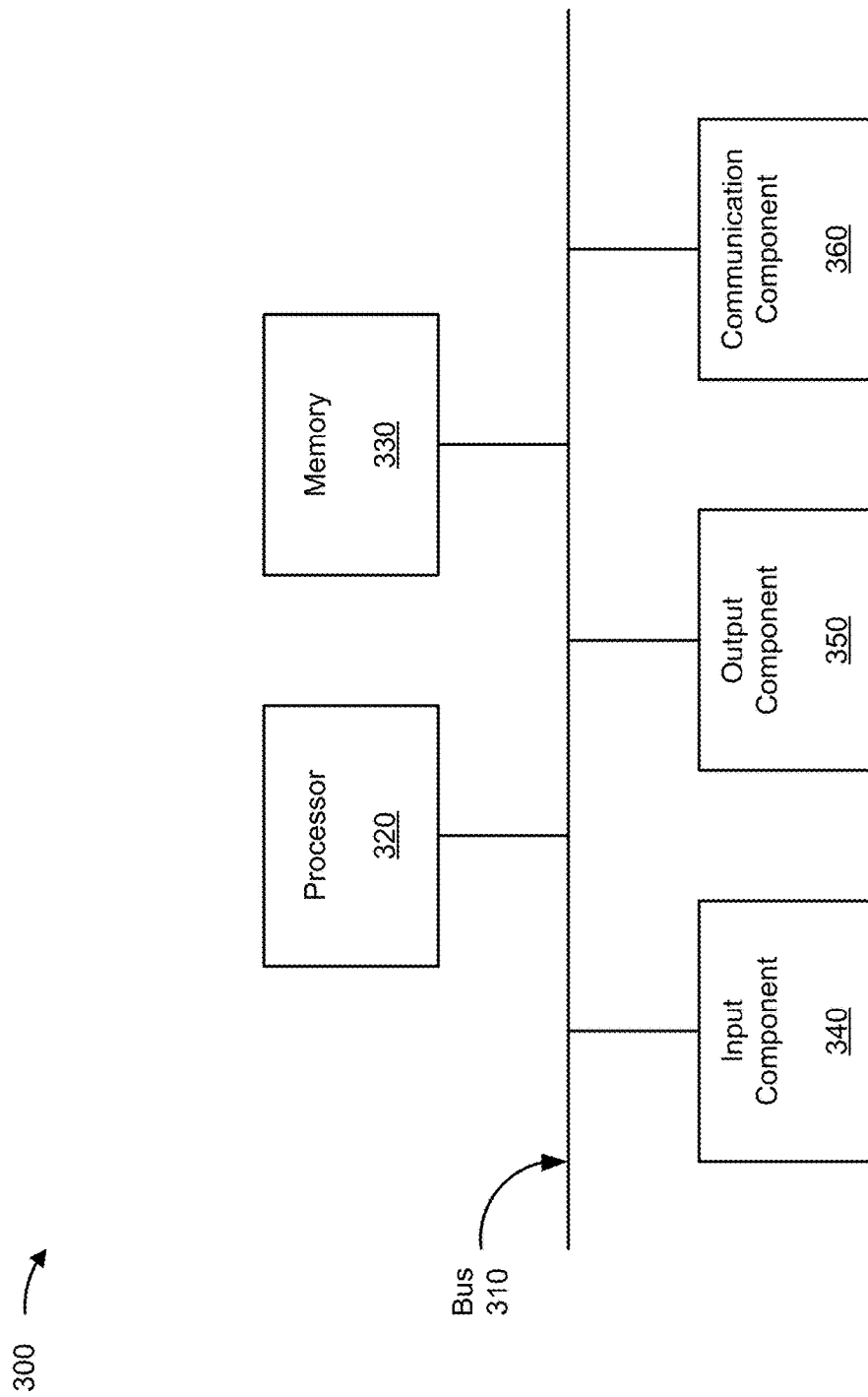
FIG. 3 is a diagram of example components of one or more devices of FIG. 2.

FIG. 3 is a diagram of example components of a device 300, which may correspond to the VR device 205, the model generation device 210, and/or the data source 215. In some implementations, VR device 205, the model generation device 210, and/or the data source 215 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
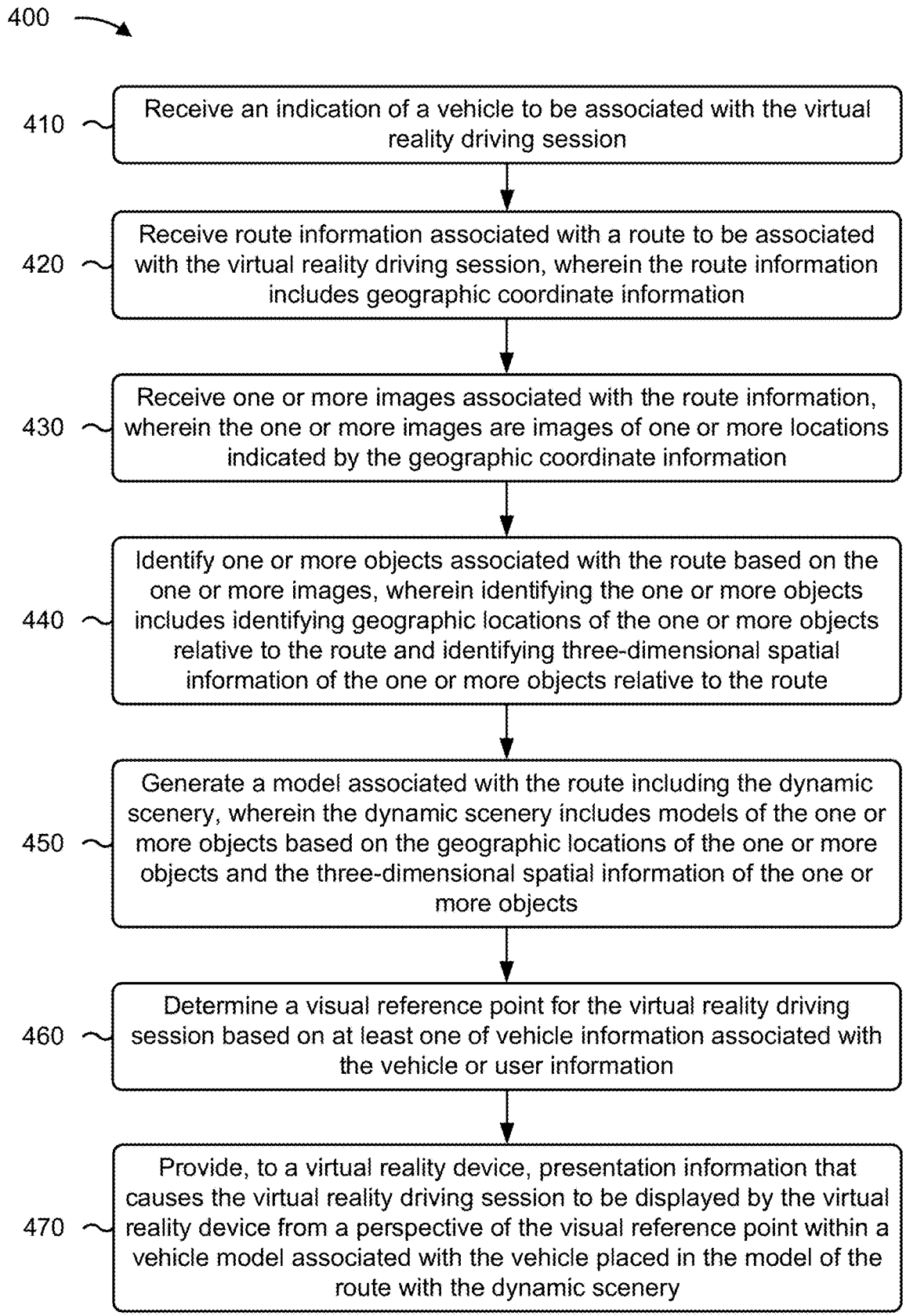
FIGS. 4 and 5 are flowcharts of an example process relating to dynamically generating scenery for a virtual reality driving session based on route information.

FIG. 4 is a flowchart of an example process 400 associated with dynamically generating scenery for a virtual reality driving session based on route information. In some implementations, one or more process blocks of FIG. 4 may be performed by a device (e.g., the model generation device 210). In some implementations, one or more process blocks of FIG. 4 may be performed by another device or a group of devices separate from or including the device, such as the VR device 205 and/or the data source 215. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an indication of a vehicle to be associated with the virtual reality driving session (block 410). As further shown in FIG. 4, process 400 may include receiving route information associated with a route to be associated with the virtual reality driving session (block 420). In some implementations, the route information includes geographic coordinate information. As further shown in FIG. 4, process 400 may include receiving one or more images associated with the route information (block 430). In some implementations, the one or more images are images of one or more locations indicated by the geographic coordinate information. As further shown in FIG. 4, process 400 may include identifying one or more objects associated with the route based on the one or more images (block 440). In some implementations, identifying the one or more objects includes identifying geographic locations of the one or more objects relative to the route and identifying three-dimensional spatial information of the one or more objects relative to the route.

As further shown in FIG. 4, process 400 may include generating a model associated with the route including the scenery (block 450). In some implementations, the scenery includes models of the one or more objects based on the geographic locations of the one or more objects and the three-dimensional spatial information of the one or more objects. As further shown in FIG. 4, process 400 may include determining a visual reference point for the virtual reality driving session based on at least one of vehicle information associated with the vehicle or user information (block 460). As further shown in FIG. 4, process 400 may include providing, to a virtual reality device, presentation information that causes the virtual reality driving session to be displayed by the virtual reality device from a perspective of the visual reference point within a vehicle model associated with the vehicle placed in the model of the route with the scenery (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
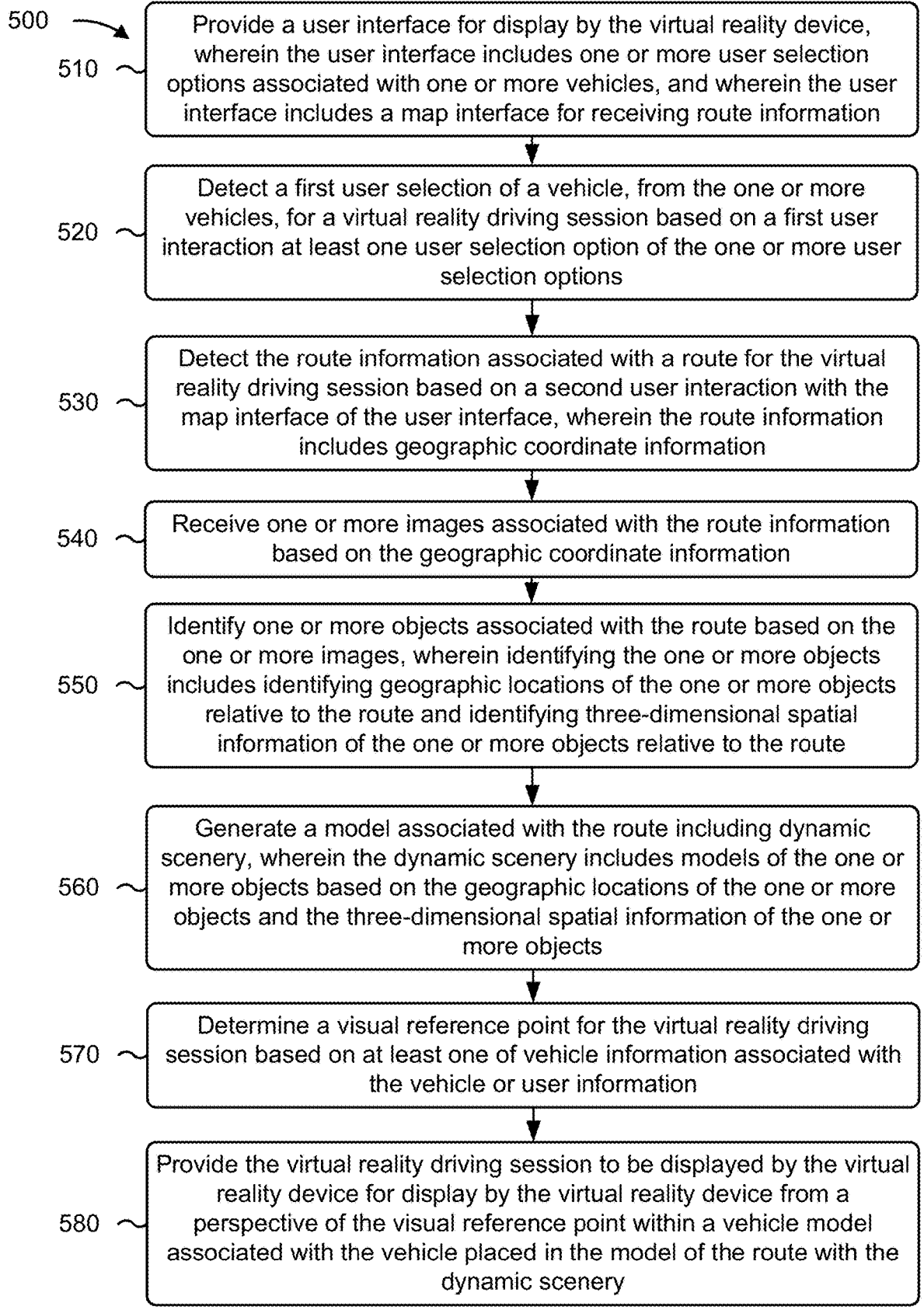

FIG. 5 is a flowchart of an example process 500 associated with dynamically generating scenery for a virtual reality driving session based on route information. In some implementations, one or more process blocks of FIG. 5 may be performed by a device (e.g., the VR device 205). In some implementations, one or more process blocks of FIG. 5 may be performed by another device or a group of devices separate from or including the device, such as the model generation device 210 and/or the data source 215. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include providing a user interface for display by the virtual reality device (block 510). In some implementations, the user interface includes one or more user selection options associated with one or more vehicles. In some implementations, the user interface includes a map interface for receiving route information. As further shown in FIG. 5, process 500 may include detecting a first user selection of a vehicle, from the one or more vehicles, for a virtual reality driving session based on a first user interaction, at least one user selection option of the one or more user selection options (block 520). As further shown in FIG. 5, process 500 may include detecting the route information associated with a route for the virtual reality driving session based on a second user interaction with the map interface of the user interface (block 530). In some implementations, the route information includes geographic coordinate information.

As further shown in FIG. 5, process 500 may include receiving one or more images associated with the route information based on the geographic coordinate information (block 540). As further shown in FIG. 5, process 500 may include identifying one or more objects associated with the route based on the one or more images (block 550). In some implementations, identifying the one or more objects includes identifying geographic locations of the one or more objects relative to the route and identifying three-dimensional spatial information of the one or more objects relative to the route. As further shown in FIG. 5, process 500 may include generating a model associated with the route including scenery (block 560). In some implementations, the scenery includes models of the one or more objects based on the geographic locations of the one or more objects and the three-dimensional spatial information of the one or more objects. As further shown in FIG. 5, process 500 may include determining a visual reference point for the virtual reality driving session based on at least one of vehicle information associated with the vehicle or user information (block 570). As further shown in FIG. 5, process 500 may include providing the virtual reality driving session to be displayed by the virtual reality device for display by the virtual reality device from a perspective of the visual reference point within a vehicle model associated with the vehicle placed in the model of the route with the scenery (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for dynamically generating scenery for a virtual reality driving session, the system comprising:
one or more memories; and
one or more processors, coupled to the one or more memories, configured to:
receive, from a virtual reality device, an indication of a vehicle to be associated with the virtual reality driving session;
receive, from the virtual reality device, route information associated with a route to be associated with the virtual reality driving session, wherein the route information includes geographic coordinate information;
generate a three-dimensional model of the route based on the geographic coordinate information and based on topographical information associated with the geographic coordinate information;
determine a visual reference point for the virtual reality driving session based on at least one of vehicle information associated with the vehicle or user information; and
provide, to the virtual reality device, presentation information that causes the virtual reality driving session to be displayed by the virtual reality device from a perspective of the visual reference point within a virtual model of the vehicle placed in the three-dimensional model of the route.

2. The system of claim 1, wherein the one or more processors are further configured to:
transmit, to the virtual reality device, user interface information to cause a user interface to be displayed by the virtual reality device, wherein at least one of the indication of the vehicle or the route information is received via the user interface.

3. The system of claim 1, wherein the topographical information indicates relative elevations associated with different points along the route.

4. The system of claim 1, wherein the one or more processors, to determine the visual reference point for the virtual reality driving session, are configured to:
identify the vehicle information associated with the vehicle, wherein the vehicle information includes a seat height relative to a ground level and a seat distance relative to a front position of the vehicle; and
determine the visual reference point in the model of the route based on the seat height and the seat distance associated with the vehicle.

5. The system of claim 1, wherein the one or more processors are further configured to:
receive, from the virtual reality device, an indication of a user input that is based on an interaction with a selectable element associated with the virtual model of the vehicle;
determine a display element associated with the virtual model of the vehicle based on the user input and the vehicle information; and
transmit, to the virtual reality device, information to cause the display element to be displayed or modified by the virtual reality device.

6. The system of claim 1, wherein the one or more processors are further configured to:
obtain an image associated with the route information;
identify, within the image, an object proximate to the route;
generate a model of the object; and
add the model of the object to the three-dimensional model of the route based on a geographical location of the object.

7. The system of claim 6, wherein the object is a building, a tree, a plant, a sign, or a road feature.

8. A method for dynamically generating scenery for a virtual reality driving session, the method comprising:
receiving, by a device and based on interaction with a vehicle selection interface displayed by a virtual reality device, an indication of a vehicle to be associated with the virtual reality driving session;
receiving, by the device and based on interaction with a route selection interface displayed by the virtual reality device, route information associated with a route to be associated with the virtual reality driving session, wherein the route information includes geographic coordinate information;
generating, by the device, a three-dimensional model of the route based on the geographic coordinate information and based on topographical information associated with the geographic coordinate information;
determining, by the device, a visual reference point for the virtual reality driving session based on at least one of vehicle information associated with the vehicle or user information; and
providing, by the device and to the virtual reality device, presentation information that causes the virtual reality driving session to be displayed by the virtual reality device from a perspective of the visual reference point within a virtual model of the vehicle placed in the three-dimensional model of the route.

9. The method of claim 8, further comprising:
transmitting, to the virtual reality device, user interface information to cause a user interface to be displayed by the virtual reality device, wherein at least one of the indication of the vehicle or the route information is received via the user interface.

10. The method of claim 8, wherein the topographical information indicates relative elevations associated with different points along the route.

11. The method of claim 8, wherein determining the visual reference point comprises:
identifying the vehicle information associated with the vehicle, wherein the vehicle information includes a seat height relative to a ground level and a seat distance relative to a front position of the vehicle; and
determining the visual reference point in the three-dimensional model of the route based on the seat height, the seat distance associated with the vehicle, and a user height indicated by the user information.

12. The method of claim 8, further comprising:
obtaining one or more images associated with the route information;
identifying, within the one or more images, one or more objects proximate to the route;
generating models of the one or more objects based on three-dimensional spatial information of the one or more objects; and
adding the models of the one or more objects to the three-dimensional model of the route based on geographic locations of the one or more objects.

13. The method of claim 12, wherein the one or more images include:
   a first image associated with a first view of the route; and
   a second image associated with a second view of the route.

14. The method of claim 12, wherein the one or more objects include at least one of a building, a tree, a plant, or a sign.

15. A non-transitory computer-readable medium storing a set of instructions, the set of instructions comprising:
   one or more instructions that, when executed by one or more processors of a device, cause the device to:
      receive an indication of a vehicle to be associated with a virtual reality driving session;
      receive route information associated with a route to be associated with the virtual reality driving session, wherein the route information includes geographic coordinate information;
      generate, based on the geographical coordination information, a three-dimensional model of the route by modeling horizontal changes in the route and vertical changes in the route;
      determine a visual reference point for the virtual reality driving session based on at least one of vehicle information associated with the vehicle or user information; and
      provide, to a virtual reality device, presentation information that causes the virtual reality driving session to be displayed by the virtual reality device from a perspective of the visual reference point within a virtual model of the vehicle placed in the three-dimensional model of the route.

16. The non-transitory computer-readable medium of claim 15, wherein the one or more instructions, when executed by the one or more processors of the device, further cause the device to:
   transmit, to the virtual reality device, user interface information to cause a user interface to be displayed by the virtual reality device, wherein at least one of the indication of the vehicle or the route information is received via the user interface.

17. The non-transitory computer-readable medium of claim 15, wherein the one or more instructions, that cause the device to determine the visual reference point for the virtual reality driving session, are configured to:
   identify the vehicle information associated with the vehicle, wherein the vehicle information includes a seat height relative to a ground level and a seat distance relative to a front position of the vehicle; and
   determine the visual reference point in the model of the route based on the seat height and the seat distance associated with the vehicle.

18. The non-transitory computer-readable medium of claim 15, wherein the one or more processors are further configured to:
   obtain one or more images associated with the route information;
   identify, within the one or more images, an object proximate to the route;
   generate a model of the object; and
   add the model of the object to the three-dimensional model of the route based on a geographical location of the object.

19. The non-transitory computer-readable medium of claim 18, wherein the object is a building, a tree, a plant, a sign, or a road feature.

20. The non-transitory computer-readable medium of claim 18, wherein the one or more images include:
   a first image associated with a first view of the route; and
   a second image associated with a second view of the route.

* * * * *